(12) United States Patent
Walden

(10) Patent No.: US 7,874,531 B1
(45) Date of Patent: Jan. 25, 2011

(54) BIG GAME SUPPORT DEVICE

(76) Inventor: David Douglas Walden, 527 S. Vermont, Columbus, KS (US) 66725

(*) Notice: Subject to any disclaimer, the term of this patent is extended or adjusted under 35 U.S.C. 154(b) by 0 days.

(21) Appl. No.: 12/583,639

(22) Filed: Aug. 24, 2009

Related U.S. Application Data

(60) Provisional application No. 61/189,928, filed on Aug. 25, 2008.

(51) Int. Cl.
| | |
|---|---|
| *F16M 11/00* | (2006.01) |
| *F16M 13/00* | (2006.01) |
| *F16L 3/00* | (2006.01) |
| *A47F 5/00* | (2006.01) |
| *A47F 7/00* | (2006.01) |
| *A47K 1/08* | (2006.01) |
| *A47G 1/10* | (2006.01) |
| *A47B 96/06* | (2006.01) |
| *E04G 5/06* | (2006.01) |
| *B60R 7/00* | (2006.01) |
| *B60R 9/00* | (2006.01) |
| *B62J 7/06* | (2006.01) |
| *A22C 21/00* | (2006.01) |
| *A22C 18/00* | (2006.01) |
| *A22B 1/00* | (2006.01) |

(52) U.S. Cl. ............... 248/176.1; 248/121; 248/123.11; 248/123.2; 248/124.2; 248/309.1; 248/312; 248/316.5; 248/231.51; 224/401; 224/456; 224/536; 224/570; 452/185; 452/187; 452/189; 452/190

(58) Field of Classification Search ............... 248/176.1, 248/121, 22.1, 123.11, 123.2, 124.2, 309.1, 248/312, 316.5, 231.51, 110, 222.1; 17/21, 17/44, 44.2, 44.3; 224/401, 456, 536, 570; 452/185, 187, 189–190
See application file for complete search history.

(56) References Cited

U.S. PATENT DOCUMENTS

| | | | |
|---|---|---|---|
| 632,359 A * | 9/1899 | Nilson | 452/190 |
| 661,637 A * | 11/1900 | Farrell | 452/190 |
| 966,676 A * | 8/1910 | Farrell | 452/190 |
| 988,587 A * | 4/1911 | Morse | 452/190 |
| 2,890,078 A * | 6/1959 | Mincey | 452/189 |
| 4,065,085 A * | 12/1977 | Gellatly | 248/124.1 |
| D312,388 S * | 11/1990 | Riener | D8/373 |
| 5,110,184 A * | 5/1992 | Stein et al. | 297/344.26 |
| 5,334,354 A * | 8/1994 | Johnston et al. | 422/104 |
| 5,901,999 A * | 5/1999 | Brock | 294/153 |
| 6,129,399 A * | 10/2000 | Burch, Sr. | 294/153 |
| 6,202,868 B1 * | 3/2001 | Murray | 212/294 |
| 6,250,483 B1 * | 6/2001 | Frommer | 212/180 |
| 7,374,388 B2 * | 5/2008 | Holt | 414/462 |
| 7,674,160 B1 * | 3/2010 | Wheeler | 452/102 |
| 2005/0035249 A1 * | 2/2005 | Busuito | 248/215 |
| 2005/0130575 A1 * | 6/2005 | Kallas | 452/195 |
| 2005/0211857 A1 * | 9/2005 | Bolinder et al. | 248/156 |
| 2006/0144246 A1 * | 7/2006 | Holliday | 99/403 |
| 2007/0254581 A1 * | 11/2007 | Hoffmann | 452/187 |

* cited by examiner

*Primary Examiner*—Terrell Mckinnon
*Assistant Examiner*—Christopher Garft
(74) *Attorney, Agent, or Firm*—Emery L. Tracy

(57) ABSTRACT

A big game support device for supporting and posing big game animals on a surface is provided. The big game animals having a first antler and a second antler. The big game support device comprises a clamping mechanism for directly and releasably clamping both the first antler and the second antler and an elevating mechanism for elevating the clamping means above the surface.

15 Claims, 2 Drawing Sheets

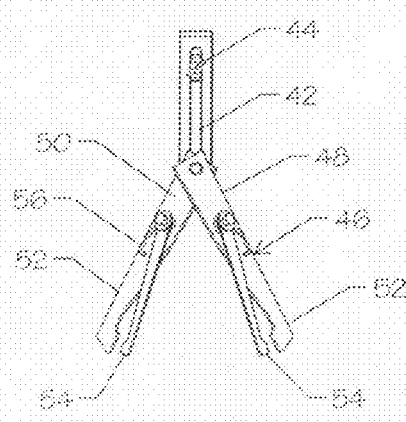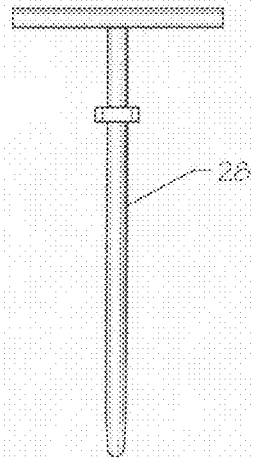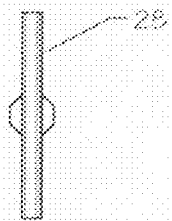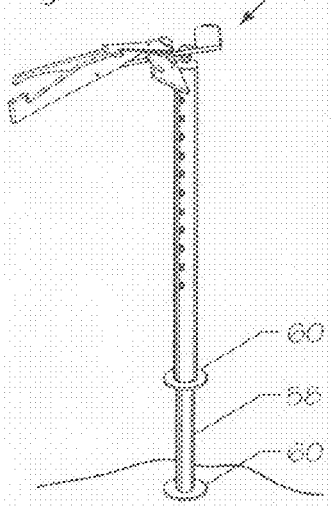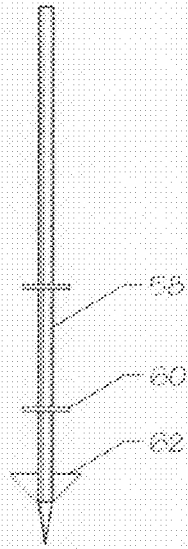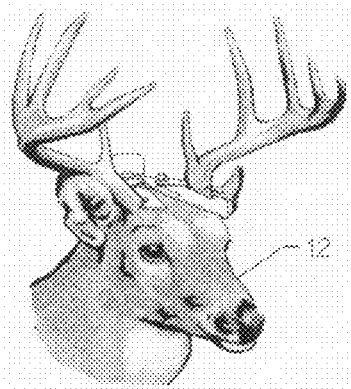

US 7,874,531 B1

BIG GAME SUPPORT DEVICE

The present application claims the benefit of priority of pending provisional patent application Ser. No. 61/189,928, filed on Aug. 25, 2008, entitled "The Deer Stand".

BACKGROUND OF THE INVENTION

1. Field of the Invention

This invention relates generally to a big game support mounting device and, more particularly, the invention relates to a big game support device for supporting and posing antlered big game animals allowing the hunter or others to have both hands free while photographing or otherwise memorializing the big game animal.

2. Description of the Prior Art

In North America, as well as elsewhere, there are at least 27 big game species that are regularly hunted by sportsmen. Antler-bearing animals, such as deer and elk and the like, have been prize trophies for many hunters for centuries. When a hunter scores a kill in the field, many times the hunter wishes to have the moment memorialized for friends and family back home and for their own memories. Unfortunately, due to the size of these animals, it is often difficult to pose the animal in the best position for showing the beauty and features of the animal. Many times a hunter must position the animal in an awkward, unnatural position and then pose by the animal without moving or otherwise ruining the animal's pose.

Accordingly, there exists a need for a big game support device that poses an antlered big game animal. Additionally, a need exists for a big game support device that allows a hunter or others to maneuver around and about a supported big game animal without having to hold the animal. Furthermore, there exists a need for a big game support device that maintains the desired position of the animal while the animal is being photographed or otherwise memorialized.

SUMMARY

The present invention is a big game support device for supporting and posing big game animals on a surface. The big game animals having a first antler and a second antler. The big game support device comprises a clamping mechanism for directly and releasably clamping both the first antler and the second antler and an elevating mechanism for elevating the clamping means above the surface.

The present invention further includes a method for supporting and posing big game animals on a surface. The big game animals having a first antler and a second antler. The method comprises directly and releasably clamping both the first antler and the second antler and elevating the first antler and the second antler above the surface.

BRIEF DESCRIPTION OF THE DRAWINGS

FIG. 6 is a top plan view illustrating the mounting portion of the big game support device, constructed in accordance with the present invention;

FIG. 7 is an elevational side view illustrating a securing rod of the big game support device, constructed in accordance with the present invention;

FIG. 8 is a top plan view illustrating the securing rod of the big game support device, constructed in accordance with the present invention;

FIG. 9 is a perspective view illustrating another embodiment of the big game support device, constructed in accordance with the present invention;

FIG. 10 is an elevational side view illustrating a vertical support rod of the big game support device, constructed in accordance with the present invention; and FIG. 11 is a perspective view illustrating a big game animal supported within the big game support device.

DETAILED DESCRIPTION OF THE PREFERRED EMBODIMENTS

As illustrated in FIGS. 1-11, the present invention is a big game support device, indicated generally at 10, for supporting and posing dead antlered big game animals 12 allowing the hunter or others to have both hands free while photographing or otherwise memorializing the big game animal 12. The big game support device 10 of the present invention is designed for displaying deer, antelope, elk, and other antlered big game animals.

The big game support device 10 of the present invention has a first embodiment, i.e., a ground resting embodiment, and a second embodiment, i.e., a ground-penetrating embodiment. Each embodiment of the big game support device 10, including the similarities and differences, will now be discussed.

Figure 1:
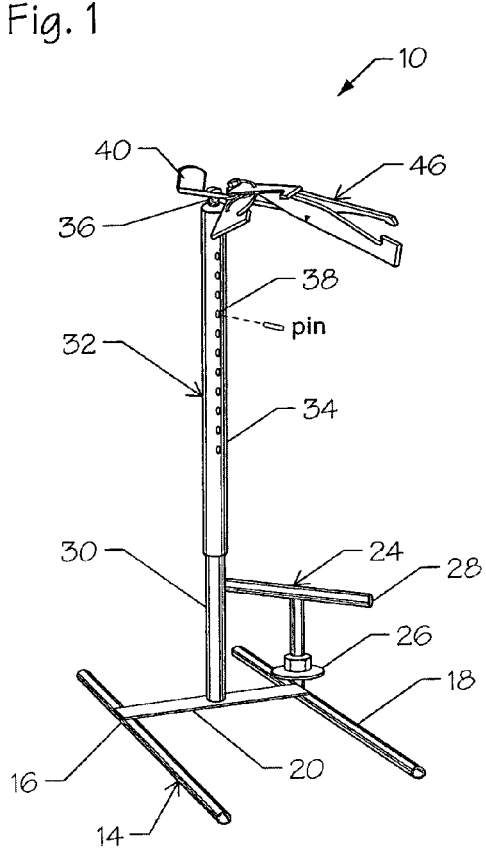
FIG. 1 is a perspective view illustrating a big game support device, constructed in accordance with the present invention.
Figure 2:
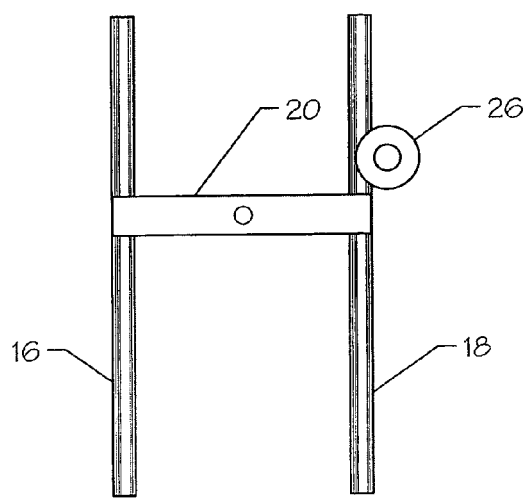
FIG. 2 is a top plan view illustrating a base of the big game support device, constructed in accordance with the present invention.
Figure 3:
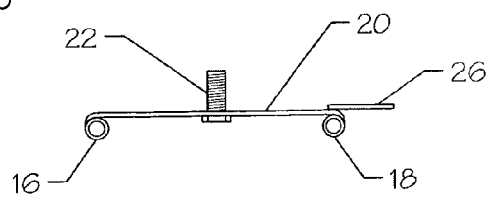
FIG. 3 is an elevational side view illustrating the base of the big game support device, constructed in accordance with the present invention.

As best illustrated in FIGS. 1-3, the ground resting embodiment of the big game support device 10 of the present invention includes a base 14 restable on a surface. The base 14 has a first base support 16 and a second base support 18 each having a first end and a second end. The first base support 16 is positioned substantially parallel to the second base support 18. A connecting member 20 extends between the first base support 16 and the second base support 18. Preferably, the connecting member 20 is positioned upon and secured to the first base support 16 and the second base support 18 at an off-center location closer to either the first end or the second end of the first base support 16 and the second base support 18. Positioning the connecting member 20 in an off-center position provides better leverage and support for the animal. In a preferred embodiment, the connecting member 20 is welded to the first base support 16 and the second base support 18 although securing the connecting member 20 to the first base support 16 and the second base support 18 is within the scope of the present invention.

The connecting member 20 of the base 14 of the big game support device 10 of the present invention has a protrusion 22 positioned in the approximate center of the connecting member 20 evenly space between the first base support 16 and the second base support 18. In an embodiment of the present invention, the protrusion 22 is a bolt welded to the connecting member 20 and extending approximately one (1") inch in a perpendicular direction relative to the connecting member 20.

It should be noted that it is within the scope of the present invention for the protrusion 22 to extend more or less than one (1") inch.

The base 14 of the big game support device 10 of the present invention further includes a securement mechanism 24 for further maintaining the position of the big game support device 10 relative to the surface. In an embodiment of the present invention, the securement mechanism 24 is a washer 26 welded to the second base support 18 between the connecting member 20 and the first end of the second base support 18. As illustrated in FIGS. 7 and 8, a securing rod 28 is insertable through the washer 26 of the securement mechanism 24 and into the surface. The securing rod 28 preferably has a slight taper on the inserting end for assisting the user in inserting the securing rod 28 into the ground or other surface.

Figure 4:
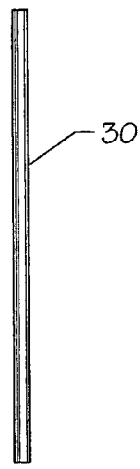
FIG. 4 is an elevational side view illustrating the vertical support rod of the big game support device, constructed in accordance with the present invention.

As best illustrated in FIG. 4, the big game support device 10 further includes a vertical support rod 30 having a first end and a second end. The vertical support rod 30 is positioned for extending in a vertical manner from the base 14 substantially perpendicular to the connecting member 20. Preferably, the vertical support rod 30 is a hollow rod with the first end of the vertical support rod 30 receiving the protrusion 22 and resting upon the connecting member 20.

Figure 5:
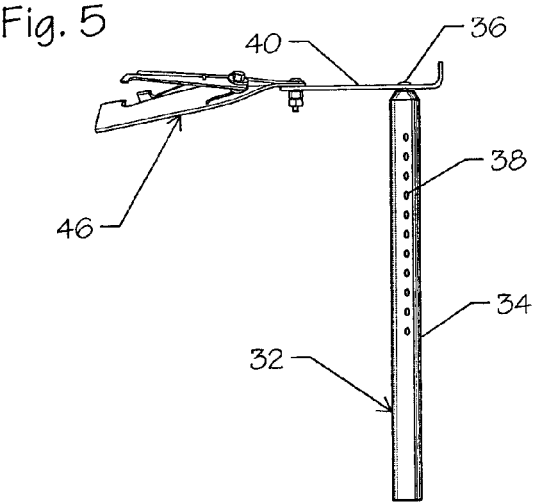
FIG. 5 is an elevational side view illustrating a mounting portion of the big game support device, constructed in accordance with the present invention.

As best illustrated in FIGS. 5 and 6, the big game support device 10 additionally includes a mounting portion 32. The mounting portion 32 includes a vertical mounting support 34 having an open first end and a closed second end with the first end of the vertical mounting support 34 receiving the second end of the vertical support rod 30. Preferably, the vertical mounting support 34 is a hollow rod having an inside diameter greater than an inside diameter of the vertical support rod 30 thereby allowing the second end of the vertical support rod 30 to be freely received within the vertical mounting support 34. The second end of the vertical mounting support 34 preferably has an extension member 36 extending therefrom. Preferably, the extension member 36 is a threaded bolt or the like.

The vertical mounting support 34 of the mounting portion 32 of the big game support device 10 has a plurality of spaced apertures 38 formed therein between the first end and the second end of the vertical mounting support 34. Each of the apertures is sized for receiving a pin 39, bolt or screw acting against the vertical support rod 30 to adjust the height of the mounting portion 32 relative to the ground or surface.

The mounting portion 32 of the big game support device 10 further includes a horizontal mounting support 40 releasably securable to the second end of the vertical mounting support 34. The horizontal mounting support 40 has a slot 42 formed therein for receiving the extension member 36 extending from the second end of the vertical mounting support 34. A wing nut 44 or other type of securement means is threadably received on the extension member 36 for releasably securing the mounting portion 32 in a desired position.

In addition, the mounting portion 32 of the big game support device 10 includes a clamping mechanism 46 rotationally secured to the horizontal mounting support 40 for holding the antlers of the big game animal 12. The clamping mechanism 46 has a first clamping portion 48 and a second clamping portion 50. The first clamping portion 48 and the second clamping portion 50 are movable independently of each other to accommodate the different size antlers, as will be described in further detail below.

Each of the clamping portions 48, 50 has a first clamping arm 52 and a second clamping arm 54. The second clamping arm 54 is biased toward the first clamping arm 52 by a biasing mechanism 56 for clamping the pedicle area of the antler. In a preferred embodiment, the biasing mechanism 56 is a torsion spring although other types of biasing mechanisms are within the scope of the present invention. Furthermore, the clamping portions 48, 50 can be larger or smaller depending on the size of the antlered big game animal 12.

As best illustrated in FIGS. 9 and 10, the ground-penetrating embodiment of the big game support device 10 of the present invention includes the mounting portion 32, as described above, and a supporting rod 58 drivable into the ground for supporting the mounting portion 32. The supporting rod 58 has at least one guard 60 surrounding the supporting rod. In an embodiment, the supporting rod 58 has a first guard for limiting the extent of the supporting rod's 58 insertion into the ground and a second guard for limiting the extent of the mounting portion 32 being received on the supporting rod 58. Height of the mounting portion 32 can also be controlled by the interaction of the apertures and bolts, as described above. Furthermore, the supporting rod 58 can include a wing piece 62 drivable into the ground for further stabilizing the big game support device 10.

The big game support device 10 of the present invention is preferably constructed of a metal material although constructing the big game support device 10 form other materials is within the scope of the present invention. In addition, the big game support device 10 preferably has a finish applied thereon to keep the metal from rusting or otherwise corroding. A material camouflage finish is desirable so that the big game support device blends with the environment.

As illustrated in FIG. 11, the big game support device 10 of the present invention supports antlered big game animals 12 allowing the hunter or others to have, both hands free while photographing or otherwise memorializing the big game animal. In use, the big game animal 12 is laid out horizontally on the ground or other surface with the head of the animal 12 adjacent to the big game support device 10. The head of the animal 12 is then maneuvered to position the antlers adjacent the clamping portions 48, 50. The clamping arms 52, 54 are urged apart and the antlers are positioned therebetween. As the clamping arms 52, 54 are released, the clamping arms 52, 54 grasp the antlers maintaining the head of the big game animal 12 upright while the remainder of the animal 12 is laid out. The hunter or others can now maneuver around and pose adjacent the big game animal 12.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A big game support device for supporting and posing big game animals on a surface, the big game animals having a first antler and a second antler, the big game support device comprising:
    a base restable on the surface and a vertical support rod extending from the base in a generally upward direction;
    a vertical mounting support receiving at least a portion of the vertical support rod;
    an extension member extending in a vertical direction from the vertical mounting support;

a horizontal mounting support releasably securable to the vertical mounting support, the horizontal mounting support having a slot for receiving the extension member;

securement means for releasably securing the vertical mounting support in a desired position relative to the vertical mounting support; and a clamping mechanism rotationally secured to the horizontal mounting support, the clamping mechanism having a first clamping portion for clamping the first antler and a second clamping portion for clamping the second antler, each of the clamping portions having a first clamping arm and a second clamping arm, the second clamping arm being biased toward the first clamping arm for clamping the antler.

2. The big game support device of claim 1 wherein the base has a first base support and a second base support, each of the first base support and the second base support having a first end and a second end, the first base support is positioned substantially parallel to the second base support, and a connecting member extending between the first base support and the second base support.

3. The big game support device of claim 2 wherein the connecting member is positioned upon and secured to the first base support and the second base support at an off-center location closer to either the first end or the second end of the first base support and the second base support.

4. The big game support device of claim 2 and further comprising:

a protrusion positioned in the approximate center of the connecting member evenly space between the first base support and the second base support.

5. The big game support device of claim 4 wherein the vertical support rod is a hollow rod receiving the protrusion and resting upon the connecting member.

6. The big game support device of claim 1 and further comprising:

a securement mechanism mounted on the base; and a securing rod insertable through the securement mechanism into the surface.

7. The big game support device of claim 1 wherein the second clamping arm is biased toward the first clamping arm by a torsion spring between the clamping arms.

8. The big game support device of claim 1 wherein the first clamping portion and the second clamping portion are movable independently of each other.

9. The big game support device of claim 1 and further comprising:

adjustment means for adjusting the position of the vertical mounting support relative to the vertical support rod.

10. A method for supporting and posing big game animals on a surface, the big game animals having a first antler and a second antler, the method comprising:

resting a base on the surface, the base having a first base support and a second base support, each of the first base support and the second base support having a first end and a second end, the first base support is positioned substantially parallel to the second base support, and a connecting member extending between the first base support and the second base support;

positioning a protrusion in the approximate center of the connecting member evenly spaced between the first base support and the second base support;

extending a vertical support rod from the protrusion in a generally upward direction;

positioning a vertical mounting support over at least a portion of the vertical support rod;

extending an extension member in a vertical direction from the vertical mounting support;

releasably securing a horizontal mounting support to the vertical mounting support, the horizontal mounting support having a slot for receiving the extension member;

releasably securing the mounting portion in a desired position relative to the vertical mounting support; and rotationally securing a clamping mechanism to the horizontal mounting support, the clamping mechanism having a first clamping portion for clamping the first antler and a second clamping portion for clamping the second antler, each of the clamping portions having a first clamping arm and a second clamping arm, the second clamping arm being biased toward the first clamping arm for clamping the antler.

11. The method of claim 10 and further comprising:

positioning and securing the connecting member to the first base support and the second base support at an off-center location closer to either the first end or the second end of the first base support and the second base support.

12. The method of claim 10 wherein the first clamping portion and the second clamping portion are movable independently of each other.

13. The method of claim 10 and further comprising:

adjusting the position of the vertical mounting support relative to the vertical support rod.

14. A big game support device for supporting and posing big game animals on a surface, the big game animals having a first antler and a second antler, the big game support device comprising:

a supporting rod having a tapered end, the tapered end of the supporting rod insertable into the surface;

a vertical mounting support receiving at least a portion of the supporting rod;

an extension member extending in a vertical direction from the vertical mounting support;

a horizontal mounting support releasably securable to the vertical mounting support, the horizontal mounting support having a slot for receiving the extension member;

securement means for releasably securing the vertical mounting support in a desired position relative to the vertical mounting support; and a clamping mechanism rotationally secured to the horizontal mounting support, the clamping mechanism having a first clamping portion for clamping the first antler and a second clamping portion for clamping the second antler, each of the clamping portions having a first clamping arm and a second clamping arm, the second clamping arm being biased toward the first clamping arm for clamping the antler.

15. The big game support device of claim 14 wherein the supporting rod has a first guard for limiting the extent of the supporting rod's insertion into the ground and a second guard for limiting the extent of the mounting portion being received on the supporting rod.

* * * * *